United States Patent [19]

Sartori et al.

[11] 4,240,922

[45] Dec. 23, 1980

[54] PROCESS AND AMINE-SOLVENT ABSORBENT FOR REMOVING ACIDIC GASES FROM GASEOUS MIXTURES

[75] Inventors: Guido Sartori, Linden; David W. Savage, Summit, both of N.J.

[73] Assignee: Exxon Research & Engineering Co., Florham Park, N.J.

[21] Appl. No.: 835,811

[22] Filed: Sep. 22, 1977

Related U.S. Application Data

[62] Division of Ser. No. 768,420, Feb. 14, 1977, Pat. No. 4,100,257.

[51] Int. Cl.² ............................................. C09K 3/00
[52] U.S. Cl. ..................................... 252/189; 423/220; 423/226; 423/228; 252/190
[58] Field of Search ............... 423/220, 223, 226, 228; 260/584 R; 252/189, 190

[56] References Cited

U.S. PATENT DOCUMENTS

| | | | |
|---|---|---|---|
| 2,139,122 | 6/1978 | Hass et al. | 260/584 R |
| 2,139,124 | 12/1938 | Hass et al. | 260/584 R |
| 3,848,057 | 11/1974 | Leder et al. | 423/228 |

*Primary Examiner*—Benjamin R. Padgett
*Assistant Examiner*—J. L. Barr
*Attorney, Agent, or Firm*—Albert P. Halluin

[57] ABSTRACT

Acidic gases are substantially removed from a normally gaseous mixture by a process comprising contacting the normally gaseous mixture with an amine-solvent liquid absorbent comprising (i) an amine mixture comprised of at least about 50 mol % of a sterically hindered amine and at least about 10 mol % of a tertiary amino alcohol, wherein said sterically hindered amine contains at least one secondary amino group which is part of a ring and is attached to either a secondary or tertiary carbon atom or a primary amino group attached to a tertiary carbon atom, and (ii) a solvent for said amine mixture which is also a physical absorbent for said acidic gases. The liquid absorbent may also include up to about 35 weight percent water. The coaction of the sterically hindered amine and the tertiary amino alcohol in conjunction with the solvent provides an increase in the amount of $CO_2$ containing acidic gases absorbed compared to the use of the same sterically hindered amines alone and lowers the heat of reaction.

15 Claims, No Drawings

PROCESS AND AMINE-SOLVENT ABSORBENT FOR REMOVING ACIDIC GASES FROM GASEOUS MIXTURES

This is a division, of application Ser. No. 768,420, filed Feb. 14, 1977, now U.S. Pat. No. 4,100,257.

BACKGROUND OF THE INVENTION

1. FIELD OF THE INVENTION

This invention relates to an improved process for removing carbon dioxide containing acidic gases from normally gaseous mixtures containing them and more particularly relates to a process of accomplishing substantial removal of these acidic gases from normally gaseous mixtures by contacting the normally gaseous mixtures with a solution containing a sterically hindered amine, a tertiary amino alcohol and a solvent for said amines.

2. DESCRIPTION OF THE PRIOR ART

It is well known in the art to treat gases and liquids, such as mixtures containing acidic gases including $CO_2$, $H_2S$, $SO_2$, $SO_3$, $CS_2$, HCN, COS and oxygen and sulfur derivatives of $C_1$ to $C_4$ hydrocarbons with amine solutions to remove these acidic gases. The amine usually contacts the acidic gases and the liquids as an aqueous solution containing the amine in an absorber tower with the aqueous amine solution contacting the acidic fluid countercurrently.

The acid gas scrubbing processes known in the art can be generally broken into three (3) categories.

The first category is generally referred to as the aqueous amine process where relatively concentrated amine solutions are employed during the absorption. This type of process is often utilized in the manufacture of ammonia where nearly complete removal of the acid gas, such as $CO_2$, is required. It is also used in those instances where an acid gas, such as $CO_2$, occurs with other acid gases or where the partial pressure of the $CO_2$ and other gases are low.

A second category is generally referred to as the aqueous base scrubbing process or "hot pot" process. In this type of process a small level of an amine is included as an activator for the aqueous based used in the scrubbing solution. This type of process is generally used where bulk removal of an acid gas, such as $CO_2$, is required. This process also applies to situations where the $CO_2$ and feed gas pressures are high. In such processes, useful results are achieved using aqueous potassium carbonate solutions and an amine activator.

A third category is generally referred to as the nonaqueous solvent process. In this process, water is a minor constituent of the scrubbing solution and the amine is dissolved in the liquid phase containing the solvent. In this process, up to 50% of the amine is dissolved in the liquid phase. This type of process is utilized for specialized applications where the partial pressure of $CO_2$ is extremely high and/or where many acid gases are present, e.g., COS, $CH_3SH$ and $CS_2$.

The present invention pertains to an improved process for practicing the third category of the acid gas scrubbing processes described above, namely, the nonaqueous solvent process where up to 50% or more of the same absorbent is dissolved in the liquid phase containing a solvent for the amine.

Many industrial processes for removal of carbon dioxide containing acidic gases use regenerable solutions of amines which are continuously circulated between an absorption zone where the acidic gases, e.g., carbon dioxide, are absorbed and a regeneration zone where the amine containing absorption solution which is saturated with the acidic components is desorbed usually by steam stripping. The capital cost of these acid gas scrubbing processes is generally controlled by the size of the absorption and regeneration towers, the size of the reboilers for generating stripping steam, and the size of the condensers which condense spent stripping steam so that condensate may be returned to the system to maintain proper water balance.

The cost of operating such scrubbing plants is generally related to the amount of heat required for the removal of a given amount of acid gas, e.g., thermal efficiency, sometimes expressed as cubic feet of acid gas removed per pound of steam consumed. Means for reducing the costs in operating these industrial processes have focused on the use of absorbing systems or combinations of chemical absorbents which will operate more efficiently and effectively in acid gas scrubbing processes using existing equipment.

There are a number of patents which describe improvements to improve the efficiency of the above-described processes for removing acidic gases from gaseous mixtures. Some of these improvements are described below.

U.S. Pat. No. 2,360,861 teaches the use of cyclic tetramethylene sulfones for separating mixtures of organic compounds and U.S. Pat. Nos. 2,385,704 and 3,475,329 teach the extraction of $SO_2$ with cyclotetramethylene sulfones.

U.S. Pat. No. 3,039,251 to Kamlet teaches the use of certain sulfones, such as cyclotetramethylene sulfone (i.e., sulfolane) and the homologues thereof, alone or in combination with various alkanolamines for removal of hydrogen sulfide, mercaptans and/or carbon dioxide from normally gaseous mixtures. According to this patent, one is enabled to purify and dehydrate natural and synthetic gases, such as natural gas, synthesis gas, producer gas, coke oven gas, etc. The amines disclosed in this patent include monoethanolamine, diethanolamine, triethanolamine, N-methyldiethanolamine and alpha-aminopropionic acid.

A number of improvements and variations on the process taught by U.S. Pat. No. 3,039,251 have appeared in the patent literature. These improvements generally involve the use of specific amines or classes of amines, addition of other additives, such as iodine or water, and the use of other solvents, such as amides in place of the sulfones, etc. Examples of the patents which disclose some of these improvements are as follows:

| U.S. Pat. Nos. | |
| --- | --- |
| 3,161,461 | 3,642,431 |
| 3,347,621 | 3,653,809 |
| 3,352,631 | 3,656,887 |
| 3,363,989 | 3,656,905 |
| 3,377,138 | 3,658,462 |
| 3,463,603 | 3,681,015 |
| 3,502,428 | 3,716,620 |
| 3,532,467 | 3,719,749 |
| 3,551,102 | 3,764,665 |
| 3,551,106 | 3,767,766 |
| 3,553,936 | 3,777,010 |
| 3,565,573 | 3,801,708 |
| 3,577,221 | 3,843,512 |
| 3,618,331 | 3,928,548 |
| 3,630,666 | 3,965,244 |
| 3,632,519 | 3,965,253 |

-continued

| British Patent Specification Numbers | |
|---|---|
| 957,260 | 1,131,989 |
| 972,160 | 1,153,789 |
| 997,169 | 1,158,976 |
| 1,058,304 | 1,238,696 |
| 1,118,687 | |

| Canadian Patent Numbers |
|---|
| 951,494 |
| 729,090 |

| Dutch Patent Specification Numbers |
|---|
| 67/06653 |
| 73/12490 |
| 73/12491 |

| German Offenlegungschrift Numbers |
|---|
| 1,542,415 |
| 2,422,581 |
| 2,433,078 |

None of these patents or patent publications disclose, teach or suggest the use of sterically hindered amines and a tertiary amino alcohol with a solvent such as sulfolane or the unexpected benefits of the instant invention described herein. British Pat. Specification Nos. 972,140, 1,058,304 and 1,238,696 and U.S. Pat. No. 3,716,620, however, are of particular interest with respect to the instant invention and, accordingly, are discussed in more detail hereinafter.

British Pat. Specification No. 972,140 (which generally corresponds to U.S. Pat. No. 3,161,461) discloses a process for removing acid gases from gaseous streams by contacting the gaseous streams with a composition comprising organic solvent, such as sulfolane, and at least one amine having a weakly basic character in the range of $pK_b$ at 25° C. of 3-14, e.g., diethanolamine.

British Pat. Specification No. 1,058,304 describes a process for removing acid gases from gaseous streams by contacting the gaseous streams with an aqueous solution comprising sulfolane and a secondary alkanolamine or morpholine or derivatives of morpholine, e.g., 2,6-dimethylmorpholine, 2,6-dimethylmorpholine, 2,3,5,6-tetraethylmorpholine, 2-methylmorpholine, 2-ethylmorpholine and 2-methyl-6-ethylmorpholine. The patent specification does not teach the concept of improved working capacity as defined hereinafter or the use of sterically hindered primary alkanolamines, and more importantly the patent specification does not teach the use of a sterically hindered amine in combination with a tertiary amino alcohol and a solvent as provided by the instant invention.

British Pat. Specification No. 1,238,696 discloses a process for removing acid gases from gaseous streams by contacting the gaseous streams with a composition comprising an organic solvent and an alkanolamine such as cyclohexylamino ethanol. Sterically hindered amines as defined herein are not specifically taught in this patent specification.

U.S. Pat. No. 3,716,620 discloses a process for removing acid gases from gaseous streams by contacting the gaseous streams with a composition comprising a solution of iodine in an organic solvent which also contains an amine. Among the solvents disclosed, there are included the sulfones, e.g., sulfolane. Among the amines, there are disclosed alkanolamines with primary, secondary or tertiary amino groups having 2 to 12 carbon atoms and 1 to 3 amine groups, e.g., mono, di- and triethanolamines, N-methyl diethanolamine, N-cyclohexyldipropanolamine and diisopropanolamine.

Prior art workers have taught that sterically hindered amines would have low rates of combination with $CO_2$ and apparently concluded, although other explanations are possible, that such sterically hindered amines would be inefficient in $CO_2$ scrubbing processes. For example, Sharma, M. M., Trans. Faraday Soc., 61, 681-8 (1965) described the kinetics of reaction between $CO_2$ and COS with 38 amines, some of which are sterically hindered amines. Other researchers have attributed relatively poor absorption rates of $CO_2$ by amines to steric hindrance. See, for example, J. L. Frahn and J. A. Mills, Aust. J. Chem., 17, 256-73, 263 (1964) and M. B. Jensen, Acta Chemica Scandinavica, 11, 499-505 (1957).

Shrier and Danckwerts, Ind. Eng. Chem. Fundamentals, 8, 415 (1969) discussed the use of amines as promoters for aqueous carbon dioxide absorption solutions. However, these researchers only ran initial absorption rate experiments and did not recognize the unique capacity advantages obtained by using sterically hindered amines in an acid gas scrubbing process. Also of interest is Danckwerts and Sharma, The Chemical Engineer, Oct. 1966, pp 244-280.

U.S. Pat. No. 2,176,441 to Ulrich et al. teaches the use of amino acids having a primary, secondary or tertiary amino group and at least two nitrogen atoms to remove acidic gases. The patentees provide various general formulae for the amino acids taught to be useful in the acid gas scrubbing process. While certain "sterically hindered amines" can be derived by proper choice of substituent groups in the general formulae there is no teaching that these amines will achieve any unexpected results, such as improved regeneration rates coupled with high rates of absorption.

There are a number of patents which disclose the use of various amines as "activators" in an alkaline scrubbing solution wherein the primary absorbent is an alkaline salt such as potassium carbonate. Some of these processes are described in U.S. Pat. Nos. 2,718,454, 3,144,301, 3,637,345, 3,793,434, 3,848,057, 3,856,921, 3,563,695, 3,563,696 and 3,642,430, as well as some other patents such as Belgian Pat. No. 767,105; British Pat. Nos. 1,063,517, 1,218,083 and 1,305,718.

In the prior art processes discussed above, it is apparent that the efficiency of processes employing absorbing solutions is generally limited by the relatively slow rate of transfer of molecules of the acid gas from the gas phase to the liquid phase as well as in the regeneration of the absorbing solution. Many of the above-described prior art processes deal with means to render the acid gas scrubbing process more efficient.

In copending U.S. application Ser. No. 590,427, filed June 26, 1975, the disclosure of which is incorporated herein by reference, there is disclosed and claimed sterically hindered amine compositions useful for scrubbing acid gases. These sterically hindered amines unexpectedly improve the efficiency, effectiveness and working capacity of the acid gas scrubbing processes in all three of the abovementioned process categories. It was postulated in U.S. Ser. No. 590,427 that the increase in cyclic capacity observed with the sterically hindered amines is due to the instability of their carbamates. In that respect, sterically hindered amines are similar to tertiary amines. Tertiary amines are not used on a commercial scale for carbon dioxide containing acid gas scrubbing due to their low rates of absorption and desorption.

It has been observed that tertiary amino alcohols can replace a portion of the sterically hindered amines in the amine-solvent process disclosed in U.S. Ser. No. 590,427, and the advantages of improved cyclic capacity are still enjoyed. This advantage provides a reduction in the total amine cost owing to the lower cost of the tertiary amines compared to the sterically hindered amines.

It has also been discovered that the combination of tertiary amino alcohol and the sterically hindered amines provides a lower heat of reaction than for the amine-solvent solutions containing the sterically hindered amines alone.

SUMMARY OF THE INVENTION

In one embodiment of the present invention there is provided a process for the substantial removal of acidic gases from a normally gaseous mixture, which comprises contacting said normally gaseous mixture with an amine-solvent liquid absorbent comprising:

(i) an amine mixture comprised of at least 50 mol % of a sterically hindered amine and at least about 10 mol % of a tertiary amino alcohol, wherein said sterically hindered amine contains at least one secondary amino group which is part of a ring and is attached to either a secondary or tertiary carbon atom or a primary amino group attached to a tertiary carbon atom, and (ii) a solvent, preferably an organic solvent for said amine mixture which is a physical absorbent for said acidic gases.

In another embodiment of the present invention, there is provided an amine-solvent liquid absorbent comprising:

(a) an amine mixture comprised of:
  (i) at least about 50 mol % of a sterically hindered amine and at least about 10 mol % of a tertiary amino alcohol, wherein said sterically hindered amine contains at least one secondary amino group which is part of a ring and is attached to either a secondary or tertiary carbon atom or a primary amino group attached to a tertiary carbon atom, and (b) a solvent for said amine mixture.

The liquid absorbent composition of the present invention may optionally contain up to about 35 weight % of water, preferably up to 25 weight % water and more preferably 10 to about 20 weight % water. The water in the liquid absorbent is used to generate steam (to help the heat balance of the overall process), reduce the viscosity of the solvent, particularly sulfolane and glycol type solvents) and assist the solubility of some amine-acid gas reaction products.

The terms "solvent" and "organic solvent" as used herein are meant to include those materials which appear to act in a purely physical manner, absorbing acidic gases physically without the formation of any apparent reaction product. The terms "solvent" and "organic solvent" are to be constrasted with the so-called "chemical solvents" which involve the formation of salts or other decomposable reaction products with acidic gases.

DESCRIPTION OF THE PREFERRED EMBODIMENTS

The term "acidic gases" is meant to include $CO_2$, $H_2S$, $SO_2$, $SO_3$, $CS_2$, $HCN$, $COS$ and the oxygen and sulfur derivatives of $C_1$ to $C_4$ hydrocarbons in various amounts as they frequently appear in gaseous mixtures. These acidic gases which are generally $CO_2$, $H_2S$ and $COS$ may be present in trace amounts within a gaseous mixture or in major proportions, the major proportion preferably being $CO_2$ for the purpose of the present invention.

The contacting of the amine-solvent liquid absorbent and the acidic gases may take place in any suitable contacting tower. In such processes, the normally gaseous mixture from which the acidic gases are to be removed may be brought into intimate contact with the absorbing solution using conventional means, such as a tower packed with, for example, ceramic rings or saddles or with bubble cap plates or sieve plates, or a bubble reactor.

In a preferred mode of practicing the invention, the absorption step is conducted by feeding the normally gaseous mixture into the base of the tower while fresh and/or regenerated absorbing solution (i.e., the liquid absorbent of the present invention) is fed into the top. The normally gaseous mixture freed largely from acidic gases emerges from the top. Preferably, the temperature of the absorbing solution during the absorption step is in the range from about 20° to about 100° C., and more preferably from 40° to about 60° C. The pressure of the normally gaseous mixture feed will preferably be in the range from about 1 to about 2000 psig, and more preferably in the range from about 100 to about 1000 psig. The contacting takes place under conditions such that the acidic gases, e.g., $CO_2$ possibly in combination with $H_2S$ and/or $COS$ are absorbed by the solution. During absorption the solution is maintained in a single phase.

The liquid absorbent composition comprising the amine mixture and solvent which is saturated or partially saturated with gases, such as $CO_2$ and $H_2S$, may be regenerated so that it may be recycled back to the absorber. The regeneration should also take place in a single liquid phase. The regeneration or desorption is accomplished by conventional means, such as pressure reduction, which causes the acid gases to flash off or by passing the solution into a tower of similar construction to that used in the absorption step, at or near the top of the tower, and passing an inert gas such as air or nitrogen or preferably steam up the tower. The temperature of the solution during the regeneration step should be in the range from about 50° to about 170° C., and preferably 80° to 150° C. The absorbing solution, after being cleansed of at least a portion of the acid bodies, may be recycled back to the absorbing tower. Makeup absorbent may be added as needed.

For example, during desorption, $CO_2$ possibly in combination with $H_2S$ and/or $COS$ solutions from the high pressure absorber is sent first to a flash chamber where steam and some $CO_2$ and the $H_2S$ and/or $COS$ are flashed from the solution at low pressure. The amount of $CO_2$ containing acidic gases flashed off will in general be about 35 to 40% of the net $CO_2$ containing acidic gases recovered in the flash and stripper. This is increased somewhat, e.g., to 40 to 50%, with the high desorption rate amine blend owing to a closer approach to equilibrium in the flash. Solution from the flash drum is then stream stripped in the packed or plate tower, stripping steam having been generated in the reboiler at the base of the stripper. Pressure in the flash drum and stripper is usually 1 to about 50 psia, preferably 15 to about 30 psia, and the temperature is in the range from about 50° to about 170° C., preferably 80° to about 150° C. Stripper and flash temperatures will, of course, depend on stripper pressure, thus at about 15 to 30 psia stripper pressures, the temperature will be about 80° to about 150° C. during desorption.

In the most preferred embodiment of the present invention, substantially complete removal of carbon dioxide containing acidic gases from normally gaseous mixtures is accomplished by a process comprising:

(a) contacting said normally gaseous mixture with a liquid absorbent composition, said liquid absorbent composition comprising:
  (i) an amine mixture comprising at least 50 mol %, preferably at least 65 mol %, of a sterically hindered amino alcohol and at least about 10 mol %, and preferably 20 to about 35 mol % of a tertiary amino alcohol, wherein said sterically hindered amino alcohol contains at least one secondary amino group which is part of a ring and is attached to either a secondary or tertiary carbon atom or a primary amino group attached to a tertiary carbon atom, wherein the total amine concentration in said liquid absorbent is in the range from about 10 weight % to about 65 weight %, preferably from about 40 weight % to about 55 weight %, and
  (ii) an organic solvent which is a solvent for said amine mixture and a physical absorbent for said acidic gases, said contacting being conducted at conditions whereby the carbon dioxide containing acidic gases are absorbed, preferably at temperatures ranging from about 20° to about 100° C., and more preferably from 40° to about 60° C., and at a pressure ranging from about 1 to about 2000 psig, preferably 100 to about 1000 psig, and
  (iii) water, in an amount ranging from 1 to 35 weight %, preferably 10 to 20 weight %, and
(b) regenerating the liquid absorbent composition by a desorption step at conditions whereby at least a portion of said acidic gases are desorbed from the liquid absorbent, preferably at a temperature in the range from about 50° to about 170° C., and more preferably from 80° to about 150° C. and at a pressure ranging from about 1 to about 50 psia and more preferably from about 15 to 30 psia.

The regenerated liquid absorbent composition may thereafter be recycled to the absorber as is or it may be combined with fresh makeup scrubbing solution.

THE STERICALLY HINDERED AMINES

As stated earlier, the sterically hindered amines are preferably sterically hindered amino alcohols which include those amino alcohols which contain at least one secondary amino group which is part of a ring and is attached to either a secondary or tertiary carbon atom or a primary amino group attached to a tertiary carbon atom. The most preferred sterically hindered amino alcohols useful in the practice of the present invention include the 2-piperidine alkanols such as 2-piperidine methanol and 2-piperidine ethanol. Other amines that can be used include 2-(1-hydroxyethyl)-piperidine, 5-hydroxy-2-methyl piperidine, 2-methyl-3-hydroxy piperidine, 2,6-dimethyl-3-hydroxy piperidine and 2,5-dimethyl-4-hydroxy piperidine, 3-amino-3-methyl-1-butanol, 2-amino-2-methyl-1-butanol, 2-amino-2-methyl-3-butanol and 3-amino-3-methyl-2-pentanol.

THE TERTIARY AMINO ALCOHOLS

The tertiary amino alcohols to be used to replace a portion of the sterically hindered amine in the liquid absorbent include those tertiary amino alcohols having 4 to 8 carbon atoms and contain from 1 to 3 hydroxyl groups. Preferred tertiary amino alcohols include 3-dimethylamino-1-propanol, 1-diethylamino-2-propanol, 2-diethylaminoethanol, 3-diethylamino-1-propanol, N-methyl diethanolamine, and 1-methyl-3-hydroxy piperidine.

THE SOLVENT

The solvents useful in the practice of the present invention are preferably organic compounds which will (1) contain at least one functional group to solubilize the amines; (2) be unreactive with the amines; (3) be a liquid at room temperature; (4) have a solubility for $CO_2$ at 25° C. and one atmosphere of not less than about one volume of $CO_2$ per volume of solvent; and (5) have a boiling point at atmospheric pressure of at least about 150° C. Suitable organic solvents useful in the practice of the present invention include sulfones; sulfoxides; glycols and the mono- and diethers thereof; 1,3-dioxo compounds characterized by being a 5- to 6-membered heterocyclic ring, e.g., dioxolanes and dioxanes; aromatic ethers; aromatic hydrocarbons; pyrrolidones; piperidones; and mixtures thereof.

A specific description of the organic solvents useful in the practice of the present invention is as follows:

The sulfones useful as solvents in the practice of the present invention are based upon cyclotetramethylene sulfone, the basic and preferred species being sulfolane and otherwise known as thiophene tetrahydro-1,1-dioxide. The sulfones have the general formula:

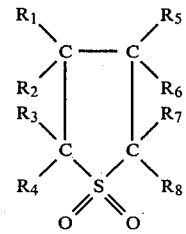

wherein at least 4 of the R substituents are hydrogen radicals and any remaining Rs being alkyl groups having from 1 to 4 carbon atoms. It is preferred that no more than 2 alkyl substituents are appended to the tetramethylene sulfone ring.

Suitable sulfone derivatives include 2-sulfolene; 2-methyl tetramethylene sulfone; 3-methyl tetramethylene sulfone; 2,3-dimethyl tetramethylene sulfone; 2,4-dimethyl tetramethylene sulfone; 3,4-dimethyl cyclotetramethylene sulfone; 2,5-dimethyl cyclotetramethylene sulfone; 3-ethyl cyclotetramethylene sulfone; 2-methyl-5-propyl cyclotetramethylene sulfone as well as their analogues and homologues.

The sulfoxides useful as solvents in the practice of the present invention include the alkyl-, cycloalkyl- or arylsulfoxides, for example, those sulfoxides of the general formula:

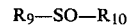

$$R_9—SO—R_{10}$$

wherein $R_9$ and $R_{10}$ are the same or different hydrocarbon monovalent radicals, for example, alkyl radicals having from 1 to 20 and preferably from 1 to 3 carbon atoms, cycloalkyl radicals having for example, from 3 to 20 carbon atoms or aryl radicals having, for example, from 6 to 20 carbon atoms. The $R_9$ and $R_{10}$ radicals may also be joined together to form an alkylene radical preferably containing 4 to 12 carbon atoms, thus resulting in a ring comprising the sulfur atom.

The following compounds are nonlimitative examples of the sulfoxides which are useful solvents: dimethyl sulfoxide, diethyl sulfoxide, dipropyl sulfoxide, dibutyl sulfoxide, methylethyl sulfoxide, dicyclohexyl sulfoxide, methylcyclohexyl sulfoxide, diphenyl sulfoxide, ethylphenyl sulfoxide, cyclohexylphenyl sulfoxide and tetramethylene sulfoxide. Dimethyl sulfoxide is the most preferred sulfoxide to be used as a solvent for the liquid absorbents of the invention.

The glycols, polyethylene glycols, polyalkylene glycols and their mono- and diethers useful in the practice of the present invention include the compounds of the following general formula:

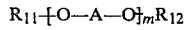

wherein A is an alkylene radical which is either linear or branched, having from 2 to 15 carbon atoms and preferably 2-5 carbon atoms; $R_{11}$ and $R_{12}$ are the same or different, e.g., hydrogen atoms, hydrocarbon monovalent radicals having, for example, from 1 to 20 carbon atoms, for example, alkyl, cycloalkyl or aryl radicals; m is an integer of 1 to 20 and preferably 1 to 10.

The following compounds are nonlimiting examples of the glycols, polyethylene glycols, polyalkylene glycols and their mono- and diethers useful as solvents for the liquid absorbents: glycol; diethylene glycol; heptaethylene glycol; decaethylene glycol; 1,3-propylene glycol; hepta-(1,3-propylene glycol), tetra-(1,4-butylene glycol), polyethylene glycol of about 400 molecular weight; and tri-(1,3-propylene glycol). The preferred compounds of this class are the polyethylene glycols and their monoalkyl ethers.

The 1,3-dioxoheterocyclic compounds useful in the practice of the present invention can be represented by the following general formulae:

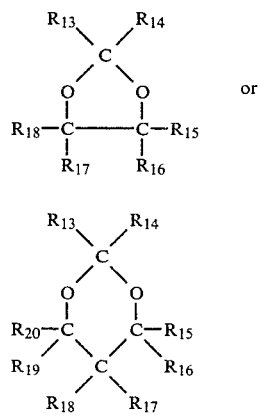

wherein $R_{13}$ to $R_{18}$ represent hydrogen, lower alkyl groups containing 3 to 5 carbon atoms, lower alkyl groups substituted with OH, OR, or phenyl groups, or unsubstituted phenyl groups so selected that the molecular ratio of carbon atoms to oxygen atoms is between 1 to 10. Typical compounds of this class which may be used in accordance with the practice of the present invention include: 2,2-dimethyl-1,3-dioxolane-4-methanol; 2-methyl-2-ethyl-1,3-dioxolane-4-methanol; 2-methyl-2-ethyl-4-methoxymethyl-1,3-dioxolane; 2,2,4-trimethyl-1,3-dioxane; 1,4-dioxaspiro (4,4) nonane; 2-hydroxymethyl-1,4-dioxaspiro (4,4) nonane; and 1,4-dioxaspiro (4,5) decane.

The aromatic hydrocarbons and aromatic ethers useful in the practice of the present invention include those compounds which are liquid at the absorption temperatures, for example, benzene, toluene, orthoxylene, metaxylene, ethylbenzene, paraethyl toluene, diphenyl ether, and their homologues having up to 12 carbon atoms.

The pyrrolidones and piperidones useful in the practice of the present invention include the N-alkyl pyrrolidones and the N-alkyl piperidones having 4 to 12 carbon atoms, for example, 2-pyrrolidone, N-methyl pyrrolidone, N-ethyl pyrrolidone and N-methyl piperidone.

The organic solvent component of the liquid absorbents of the present invention may include a mixture of two or more of the compounds described above.

THE LIQUID ABSORBENT COMPOSITION

The design of the specific compositions to be used for the acid gas scrubbing process of the present invention will be based upon the type and amount of acidic gases in the normally gaseous mixture to be scrubbed by the liquid absorbent composition of the present invention. In treating normally gaseous mixtures having a high concentration of carbon dioxide and hydrogen sulfide, e.g., 35% $CO_2$ and 10–12% $H_2S$, a liquid absorbent having a relatively high amine concentration should be used. Since it is important that the reaction product of the acidic gases and the amines remain soluble, the water content should be increased with correspondingly increased concentration of the amine mixture. Therefore, a typical composition useful for scrubbing a normally gaseous mixture having a high concentration of carbon dioxide and hydrogen sulfide will be comprised of about 50–60 weight % of the amine mixture, 1 to 15 weight % of at least one organic solvent, preferably sulfolane, and the balance water.

When the normally gaseous mixture to be treated contains a significant amount of organo sulfur compounds, e.g., mercaptans in amounts of about 6% or more, the liquid scrubbing composition of the present invention should be designed to have a high concentration of the solvent so as to solubilize the organo sulfur compounds (the organo sulfur compounds are relatively insoluble in aqueous solutions, but are solubilized by organic solvents such as sulfolane). A typical liquid scrubbing solution for use in removing large amounts of organo sulfur compounds from normally gaseous mixtures should include about 15 weight % of the amine mixture, about 75 weight % of at least one organic solvent, preferably sulfolane, and the balance, about 10 weight % water.

In those instances where carbon dioxide is the major part of the acidic gases and hydrogen sulfide and COS exist as minor components of the acidic gases in the normally gaseous mixture to be treated, it is desirable to use a liquid scrubbing composition having nearly an equivalent weight % of the amine mixture and organic solvent and sufficient water to generate steam and reduce the viscosity of the solvent. A typical liquid scrubbing solution for use in scrubbing these high $CO_2$ content gases will contain about 45 weight % of the amine mixture, about 40 weight % of the solvent, preferably sulfolane, and the balance, about 15 weight % water.

As can be seen from the above considerations, the amount of the amine mixture, solvent and optionally water to be used to prepare the liquid absorbent scrubbing composition of the present invention may vary widely, depending on the intended use and the type of gas to be treated. Generally speaking, one typical liquid absorbent composition of the present invention will contain from 10 to about 45 weight % of the amine mixture, 1 to about 35 weight % water and the balance being at least one organic solvent. Another typical liquid absorbent composition will be comprised of 45 to about 65 weight % of the amine mixture, 15 to about 35 weight % water and essentially all of the balance being at least one organic solvent for the amine mixture.

In these liquid absorbent compositions as described above, the amine mixture will contain at least about 50 mol %, preferably 65 mol % of the sterically hindered amine, preferably a sterically hindered amino alcohol and at least about 10 mol %, preferably 20 to about 35 mol % of the tertiary amino alcohol.

The normally gaseous mixture to be treated in accordance with the process of the present invention may include sour natural gas, hydrogen synthesis gas, refinery gas or any other normally gaseous mixture containing acidic gases.

The amine mixture may be used with the solvent and optionally water in any convenient manner. In one preferred embodiment of the invention a sterically hindered amino alcohol and tertiary amino alcohol are premixed with the solvent (and optionally water) and placed in the form of a concentrate. This concentrate may optionally include commonly used additives, such as antifoaming agents, antioxidants, corrosion inhibitors, etc. Examples of such additives include arsenious anhydride, selenious and tellurous acid, protides, vanadium oxides, e.g., $V_2O_3$, chromates, e.g., $K_2Cr_2O_7$, iodine and iodine compounds, etc.

It is possible, of course, to employ the process of the present invention in conjunction with other acid gas scrubbing processes. For example, solutions rich in carbon dioxide may be first scrubbed by a bulk scrubbing process using the "hot pot" process, preferably the processes disclosed in U.S. Ser. No. 590,427 and U.S. Pat. No. 4,094,957, entitled "Process for Removing Acid Gases with Hindered Amines and Aminoacids," the disclosures of which are incorporated herein by reference. This coarsely prepurified gas may then be treated in accordance with the teachings of the present invention to remove the last residues of the carbon dioxide containing gases.

The invention is illustrated further by the following examples which, however, are not to be taken as limiting in any respect. All parts and percentages, unless expressly stated to be otherwise, are by weight.

EXAMPLE 1

This example is carried out for comparison purposes only.

The reaction apparatus consists of an absorber and a desorber. The absorber is a glass vessel having a capacity of 2.5 liters and a diameter of 10 cm equipped with a heating jacket. The stirrer shaft carries two 3-blade propellers, of which the upper one pushes the liquid downward and the lower one pushes the liquid upward. A pump removes liquid from the bottom of the reactor and feeds it back above the liquid through a stainless steel sparger. The apparatus can be evacuated. Nitrogen and $CO_2$ can be fed to the bottom of the cell through a sparger.

The desorber is a 1-liter glass reactor, equipped with stirrer, gas sparger, reflux condenser and thermometer.

The following reagents are charged into the absorber:
324 g of 2-piperidine ethanol
300 g of tetrahydrothiophene-1,1-dioxide (sulfolane)
112.5 g of water The solution is brought to 40° C., then the reactor is evacuated and $CO_2$ is admitted to it. 36 liters of $CO_2$ are absorbed. The rich solution so obtained is transferred to the desorber, where it is heated at 105° C. for 15 minutes. The regenerated solution so obtained is transferred back to the absorber and subjected again to absorption. 31.9 liters of $CO_2$ are absorbed.

A wet-test meter inserted between the $CO_2$ cylinder and the absorber permits to establish the amounts of gas absorbed as a function of time. The result is given in Table I.

TABLE I

| Liters of $CO_2$ Absorbed | Time Min. | Time Sec. |
|---|---|---|
| 5 | 0 | 13 |
| 10 | 0 | 31 |
| 15 | 0 | 53 |
| 20 | 1 | 24 |
| 25 | 2 | 21 |
| 30 | 5 | 02 |

EXAMPLE 2

A new solution is prepared, in which one-third of the piperidine ethanol is replaced by an approximately equivalent amount of a tertiary amine. The solution has the following composition:
215 g of 2-piperidine ethanol
97 g of 3-dimethylamino-1-propanol
300 g of tetrahydrothiophene-1,1-dioxide (sulfolane)
112.5 g of water The solution is subjected to the same cycle as before, i.e., absorption into fresh solution, desorption and absorption into lean solution. Table II gives the amounts of $CO_2$ absorbed into lean solution as a function of time. The total amount absorbed into the lean solution is 32 liters.

TABLE II

| Liters of $CO_2$ Absorbed | Time Min. | Time Sec. |
|---|---|---|
| 5 | 0 | 13 |
| 10 | 0 | 31 |
| 15 | 0 | 53 |
| 20 | 1 | 27 |
| 25 | 2 | 27 |
| 30 | 4 | 54 |

Comparison with Table I shows that the two solutions have a very similar behavior.

EXAMPLE 3

The following solution is prepared;
215 g of 2-piperidine ethanol
109 g of 1-diethylamino-2-propanol
300 g of tetrahydrothiophene dioxide (sulfolane)
112.5 g of water Compared to the solution of Example 1, in this solution one-third of the piperidine ethanol has been replaced by an equivalent amount of a tertiary amino alcohol. The solution is subjected to the same cycle as before, i.e., absorption into fresh solution, desorption and absorption into lean solution. Table III gives the amounts of $CO_2$ absorbed into lean solution as a function of time. The total amount absorbed into the lean solution is 29.5 liters.

TABLE III

| Liters of $CO_2$ Absorbed | Time | |
|---|---|---|
| | Min. | Sec. |
| 5 | 0 | 11 |
| 10 | 0 | 27 |
| 15 | 0 | 41 |
| 20 | 1 | 21 |
| 25 | 2 | 30 |

Comparison with Table I shows that the two solutions have a similar behavior.

EXAMPLE 4

The following solution is prepared:
215 g of 2-piperidine ethanol
87 g of 2-diethylamino ethanol
300 g of tetrahydrothiophene dioxide (sulfolane)
112.5 g of $H_2O$ Compared to the solution in Example 1, in this solution one-third of the piperidine ethanol has been replaced by an approximately equivalent amount of a tertiary amino alcohol. The solution is subjected to the same cycle as before, i.e., absorption into fresh solution, desorption and absorption into lean solution. Table IV gives the amount of $CO_2$ absorbed as a function of time. The total amount absorbed into the lean solution is 29 liters.

TABLE IV

| Liters of $CO_2$ Absorbed | Time | |
|---|---|---|
| | Min. | Sec. |
| 5 | 0 | 18 |
| 10 | 0 | 30 |
| 15 | 0 | 50 |
| 20 | 1 | 21 |
| 25 | 2 | 31 |

Comparison with Table I shows that the two solutions have a similar behavior.

The process of the present invention, in addition to providing the advantages of an improved lower heat of reaction and a lower cost amine mixture compared to the use of sterically hindered amines alone, also enjoys the advantage of improved "working capacity" compared to a process operating under substantially the same conditions without the use of a sterically hindered amine as disclosed and claimed in U.S. Ser. No. 590,427, filed June 26, 1975, the disclosure of which is incorporated herein by reference. As in the case of U.S. Ser. No. 590,427, the term "working capacity" relates to the thermodynamic cyclic capacity, that is the loading as measured at equilibrium conditions. This working capacity may be obtained from the relation between the $CO_2$ pressure in the gas and the $CO_2$ loading in the solution at equilibrium at a given temperature. To calculate the thermodynamic cyclic capacity, the following parameters must usually be specified: (1) $CO_2$ absorption pressure, (2) $CO_2$ regeneration pressure, (3) temperature of absorption, (4) temperature of regeneration, (5) solution composition, that is weight percent amine, and (6) gas composition.

The improved working capacity which results by the use of the sterically hindered amine and the tertiary amino alcohol in the solvent and optionally water can be determined by direct comparison with a process wherein a sterically hindered amine is not included in the amine-solvent scrubbing liquid. For example, it will be found when comparing two amine-solvent $CO_2$ scrubbing processes (that is similar gas composition, similar scrubbing solution, similar pressure and temperature conditions) that when the sterically hindered amines and tertiary amino alcohols are utilized the difference between the amount of $CO_2$ absorbed at the end of the absorption step (at equilibrium) and desorption (at equilibrium) is significantly greater, generally at least 15% greater, and often 20 to 60% greater than the working capacity of an amine-solvent scrubbing liquid which does not include a sterically hindered amine and a tertiary amino alcohol, e.g., an amine-solvent liquid containing diisopropanolamine.

Accordingly, in another preferred embodiment of the present invention, a carbon dioxide containing acidic gas is removed from a normally gaseous stream by means of a process which comprises, in sequential steps, (1) contacting the normally gaseous feed stream with an amine-solvent liquid absorbent at conditions whereby said carbon dioxide containing gas is absorbed in said liquid absorbent, and (2) regenerating said liquid absorbent at conditions whereby said acid gas is desorbed from said liquid absorbent, the improvement which comprises operating said process at conditions whereby the working capacity is greater than obtained under substantially the same conditions of absorption and desorption except that said liquid absorbent does not include a sterically hindered amine and a tertiary amino alcohol, wherein said working capacity is defined as the difference in moles between $CO_2$ loading in the liquid absorbent at absorption conditions (step 1) and the $CO_2$ loading in the liquid absorbent at regeneration conditions (step 2) when measured at equilibrium conditions.

While the invention has been described in connection with specific embodiments thereof, it will be understood that it is capable of further modification and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

What is claimed is:
1. An amine-solvent liquid composition, comprising:
   (a) an amine mixture comprised of at least 50 mol % of a sterically hindered amine and at least about 10 mol % of a tertiary amino alcohol, wherein said sterically hindered amine contains at least one secondary amino group which is part of a ring and is attached to either a secondary or tertiary carbon atom or a primary amino group attached to a tertiary carbon atom, and
   (b) a nonreactive solvent for said amine mixture, said solvent being a member selected from the group consisting of sulfones; sulfoxides; glycols, mono- and diethers thereof; 1,3-dioxo compounds characterized by being a 5- to 6-membered heterocyclic ring; aromatic ethers; aromatic hydrocarbons; pryyolidones; piperidones; and mixtures thereof.
2. The amine-solvent liquid absorbent composition of claim 1 wherein said sterically hindered amine is a mem- ber selected from the group consisting of 2-piperidine methanol, 2-piperidine ethanol, 2-(1-hydroxy-ethyl)-piperidine, 5-hydroxy-2-methyl piperidine, 2-methyl-3-hydroxy piperidine, 2,6-dimethyl-3-hydroxy piperidine, 2,5-dimethyl-4-hydroxy piperidine, 3-amino-3-methyl-1-butanol, 2-amino-2-methyl-1-butanol, 2-amino-2-methyl-3-butanol and 3-amino-3-methyl-2-pentanol.

3. The amine-solvent liquid composition of claim 1 wherein the sterically hindered amine is a 2-piperidine alkanol.

4. The amine-solvent liquid composition of claim 1 wherein the tertiary amino alcohol is a member selected from the group consisting of 3-dimethylamino-1-propanol, 1-diethylamino-2-propanol, 2-diethylamino ethanol, 3-diethylamino-1-propanol, N-methyl diethanolamine and 1-methyl-3-hydroxy piperidine.

5. The amine-solvent liquid composition of claim 1 wherein the nonreactive solvent is a suflone.

6. The amine-solvent liquid absorbent composition of claim 5 wherein said nonreactive solvent is a cyclotetramethylene sulfone.

7. The amine-solvent liquid absorbent composition of claim 6 wherein said sulfone is solfolane.

8. An amine-solvent liquid absorbent composition comprising:
(a) an amine mixture comprised of at least 50 mol % of a sterically hindered amine and at least 10 mol % of a tertiary amino alcohol, wherein said sterically hindered amine is a member selected from the group consisting of 2-piperidine methanol and 2-piperidine ethanol and said tertiary amino alcohol is a member selected from the group consisting of 3-dimethylamino-1-propanol, 1-diethylamino-2-propanol and 2-diethylamino ethanol; and
(b) a nonreactive solvent for said amine mixture, said solvent being a cyclotetramethylene sulfone.

9. The amine-solvent liquid absorbent composition of claim 8 wherein said nonreactive solvent is sulfolane.

10. The amine-solvent liquid absorbent composition of claim 8 which additionally include up to about 35 weight percent water.

11. The amine-solvent liquid absorbent composition of claim 10 wherein the water content is in the range from about 10 to about 20 weight percent.

12. An amine-solvent liquid absorbent composition comprising:
(a) an amine mixture comprised of at least about 65 mol % of 2-piperidine ethanol and 20 to about 35 mol % of a tertiary amino alcohol selected from the group consisting of 3-dimethylamino-1-propanol, 1-diethylamino-2-propanol and 2-diethylamino ethanol, wherein the total amine concentration in said liquid absorbent is in the range from about 10 weight % to about 65 weight %;
(b) water, in an amount ranging from about 10 to about 20 weight %; and
(c) essentially all of the balance being sulfolane.

13. The composition of claim 1 wherein the composition additionally includes additives selected from the group consisting of antifoaming agents, antioxidants and corrosion inhibitors.

14. The composition of claim 8 wherein the composition additionally includes additives selected from the group consisting of antifoaming agents, antioxidants and corrosion inhibitors.

15. The composition of claim 12 wherein the composition additionally includes additives selected from the group consisting of antifoaming agents, antioxidants and corrosion inhibitors.

* * * * *